March 14, 1944. C. E. TACK 2,343,939
BRAKE ARRANGEMENT
Filed May 23, 1941 2 Sheets-Sheet 1
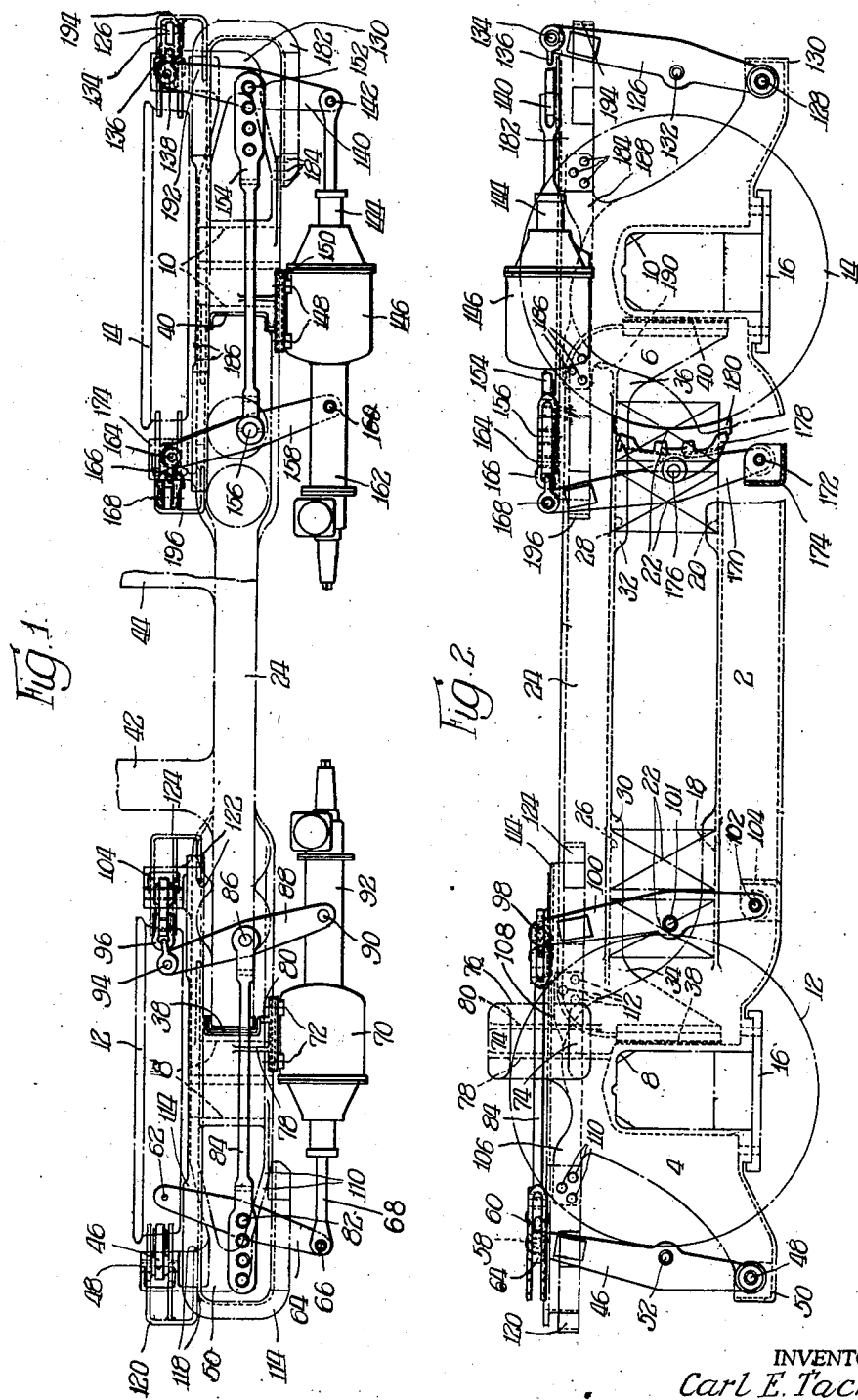
INVENTOR.
Carl E. Tack,
BY
atty March 14, 1944.  C. E. TACK  2,343,939
BRAKE ARRANGEMENT
Filed May 23, 1941   2 Sheets-Sheet 2
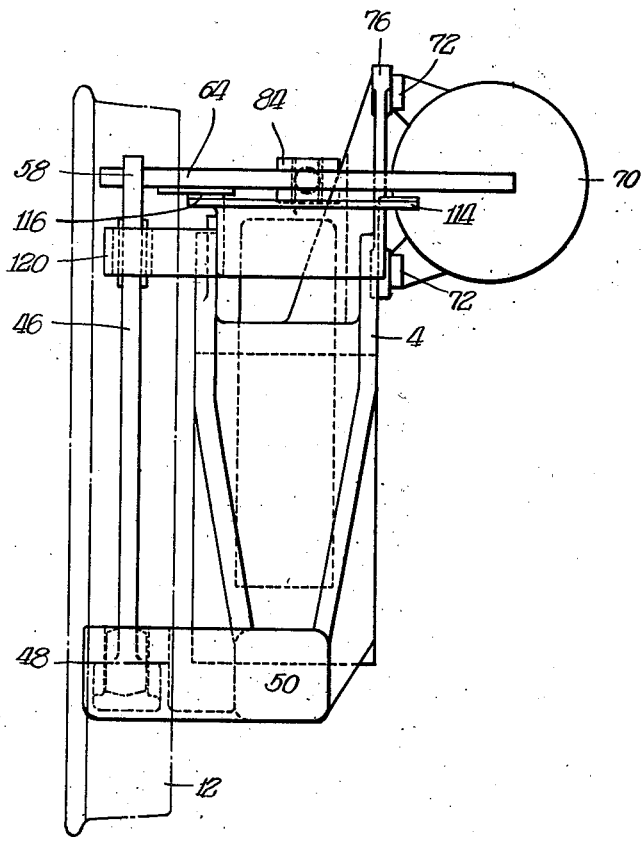
INVENTOR.
Carl E. Tack,
BY Patented Mar. 14, 1944

2,343,939

UNITED STATES PATENT OFFICE 2,343,939

BRAKE ARRANGEMENT

Carl E. Tack, Chicago, Ill., assignor to American Steel Foundries, Chicago, Ill., a corporation of New Jersey Application May 23, 1941, Serial No. 394,743

37 Claims. (Cl. 188—56)

My invention relates to a brake arrangement for a railway car truck and more particularly to such an arrangement commonly designated unit cylinder type wherein the power means for operating the rigging is supported on the truck frame.

A general object of my invention is to design a clasp brake arrangement for a four wheel railway freight car truck wherein an independent brake arrangement will be afforded for each wheel at each side of the truck and particularly adapted for use with the novel form of car truck illustrated. The said novel form of car truck comprises a composite side frame structure including a lower member with wheel connecting means, spaced supporting wheel and axle assemblies and an upper side frame member with which may be integrally formed spaced transoms forming a usual means of support for a swing bolster normally positioned therebetween. In this novel arrangement the upper side frame member may be supported from the lower side member through the medium of springs supported at spaced points on said lower member inwardly of each pedestal jaw opening, said upper frame member being formed with pedestal means for abutment with the lower member at one side of the pedestal opening at each end of the truck in order to limit relative longitudinal movement between said members.

In this novel arrangement the lower side frame member may be extended beyond each pedestal opening to form an integral bracket well below the axle level and said bracket may be projected inboard the truck to form a fulcrum for the bottom end of vertically arranged dead brake levers, sometimes designated hanger levers inasmuch as said levers form the carrying means for the associated brake heads and brake shoes.

An important feature of my novel brake arrangement is the fulcruming of the hanger levers below the axle levels and adjacent the bottom level of the truck frame in order to afford additional space above said frame.

In the drawings

Figure 1 is a top plan view of one side of a car truck and brake arrangement embodying my invention, the upper frame member being cut away at one end thereof in order more clearly to show the arrangement therebeneath.

Figure 2 is a side elevation of the truck and brake arrangement shown in Figure 1, a portion of the bottom member of the side frame being cut away in order to show more clearly the connection of the dead brake lever intermediate the wheels, and Figure 3 is an end elevation thereof taken from the left as seen in Figures 1 and 2.

In each of the views certain details may be omitted where they are shown more clearly in other views.

Describing the structure in detail, the truck comprises a bottom side frame or equalizer member generally designated 2 having a substantially horizontal midportion of rectangular section with which may be formed integral end portions 4 and 6 serving as wheel connecting means. The end portions have pedestal openings designated respectively 9 and 10 in which may be received in usual manner the journal ends of spaced wheel and axle assemblies 12 and 14, and each pedestal opening may have the usual bottom closure plate 16. Each of the end portions 4 and 6 may be continued beyond the pedestal opening to form an integral inturned bracket well below the axle level serving as fulcrum means for an end hanger lever.

Inwardly of each pedestal opening the frame member 2 may be formed with spaced spring seats designated respectively 18 and 20 on each of which may be positioned a plurality of springs diagrammatically indicated at 22, 22 affording support for the superposed frame member generally designated 24. The side portions of the frame member may be afforded spring seats at 26 and 28 flanged over as at 30 and 32, said flanges being continued into the pedestals 34 and 36 at the extremities of the member 24. The pedestals 34 and 36 have sliding engagement as at 38 and 40 with the adjacent pedestal walls of the bottom frame member 2 and thus limit the relative longitudinal movement of the supported frame member 24 with respect to said bottom frame member 2. The top frame member 24 has integrally formed spaced transoms 42 and 44 serving as a usual means of support for a swing bolster which may be connected therebetween and which serves as a bearer for the supported car body.

The brake rigging for the respective wheels is substantially identical and may be described as shown in Figures 1 and 2, left. The dead inverted hanger lever 46 may be fulcrumed as at 48 at its lower end from the extremity of the inturned bracket 50 integrally formed on the end portion 4 of the lower frame member, said hanger lever 46 having pivotally supported intermediate its ends as at 52 a brake head (not shown) carrying a brake shoe arranged for engagement with the periphery of the adjacent wheel 12. The upper end of the hanger lever 46 may have a pivotal connection as at 58 with the clevis means 60 and the opposite end of said clevis means may be connected as at 62 to the inner end of the transversely arranged live cylinder lever 64. The opposite end of said live cylinder lever has a pivotal connection as at 66 to the piston rod 68 of the power means 70 which may be mounted as at 72, 72 on the cylinder pads 74, 74 formed at the top of the bracket 76 which is formed as an integral part of the end portion 4 on the bottom frame member 2, said bracket 76 being reinforced by transverse ribs or gussets 78 and 80.

Intermediate the ends of the live cylinder lever 64 may be pivotally and adjustably connected as at 82 the pull rod 84 and the opposite end of said pull rod has a pivotal connection as at 86 with the transversely arranged dead cylinder lever 88, the outer end of which may have pivotal and automatically adjustable connection as at 90 to the slack adjuster 92 which may be mounted at one end of the power means 70. The inboard end of the dead cylinder lever 88 may have pivotal connection as at 94 to the clevis means 96, the opposite end of which may have pivotal connection as at 98 to the inverted dead hanger lever 100, the lower end of which may be fulcrumed as at 102 from the bracket 104 formed on the inboard face of the frame member 2 below the level of the spring seat 18. Intermediate the ends of the hanger lever 100 may be pivotally supported as at 101 a brake head (not shown) supporting a brake shoe for engagement with the opposite periphery of the last-mentioned wheel. In the showing at this end of the truck the dead hanger levers 46 and 100 are illustrated in the positions assumed after maximum wear of the wheel tread and the brake shoes, whereas the showing at the opposite end of the truck illustrates the arrangement of parts with new wheels and new brake shoes.

Atop the end portion 4 of the bottom frame member and approximately over the journal opening 8 and at opposite sides thereof may be formed the integral brackets 106 and 108 serving as support means as at 110, 110 and 112, 112 respectively for the angle iron guide bracket 114, said guide bracket affording slidable support as at 116 (Figure 3) for the inboard end of the live cylinder lever 64. At the outer end of the guide bracket 114 and on the inboard face thereof may be supported as at 118 the U-shaped strap 120 which serves as a guide for the upper end of the dead hanger lever 46 as may best be seen from the end view of Figure 3. At the opposite end of the guide bracket 114 may similarly be secured as at 122 the U-shaped strap 124 simultaneously serving as guide means for the upper end of the dead hanger lever 100.

The arrangement at the other end of the truck is substantially identical to that just described and comprises the dead hanger lever 126 (Figure 2, right) fulcrumed at its lower end as at 128 from the extremity of the inturned bracket 130 integrally formed with the end portion 6 of the bottom frame member 2. Intermediate the ends of the dead hanger lever 126 may be pivotally supported as at 132 a brake head (not shown) carrying a brake shoe for engagement with the periphery of the adjacent wheel. The upper end of the dead hanger lever 126 may have pivotal connection as at 134 with the clevis means 136 whose opposite end may be connected as at 138 to the inner end of the transversely arranged live cylinder lever 140, the outer end thereof having pivotal connection as at 142 to the piston rod 144 of the power means 146. The power means 146 may be supported as at 148, 148 (Figure 1) from the bracket 150 formed on the end portion 6 of the lower frame member approximately above the journal opening therein. Intermediate the ends of the live cylinder lever 140 may be pivotally and adjustably connected as at 152 the pull rod 154 whose opposite end may have pivotal connection as at 156 with the dead transversely arranged cylinder lever 158 whose outboard end has pivotal and automatically adjustable connection as at 160 to the slack adjuster 162 mounted at one end of the power means 146. The inner end of the dead cylinder lever 158 may have pivotal connection as at 164 to the clevis means 166 whose opposite end may be pivotally connected as at 168 to the upper end of the dead hanger lever 170 and the lower end of said dead hanger lever may be fulcrumed as at 172 from the bracket 174 integrally formed on the inboard face of the bottom frame member 2 intermediate the wheels. Intermediate the ends of the dead hanger lever 170 may be pivotally supported as at 176 the brake head 178 supporting the brake shoe 180 for engagement with the inner periphery of the last-mentioned wheel.

In this arrangement guide and support means are afforded for the brake rigging in the manner similar to that described for the opposite end of the truck and comprises the angle support bracket 182 supported as at 184, 184 and 186, 186 from brackets 188 and 190 integrally formed with the end portion 6 of the bottom frame member 2 approximately over the pedestal opening 10. The bracket 182 affords support as at 192 (Figure 1) for the inboard end of the live cylinder lever 140 and straps 194 and 196 mounted at opposite ends of the bracket 182 afford guide means for the upper ends of the dead hanger levers 126 and 170 respectively.

It will thus be seen that by my novel arrangement I have provided support from the bottom frame member for the brake rigging associated with each wheel and independent power means therefor. It may be noted that the support means for the rigging from said bottom frame member is located well below the axle level and that none of the rigging extends inboard the wheels so that all of the space therebetween is left free for accommodation of a low hung car body. Moreover, the rigging is supported entirely independently of the top frame member which carries the transoms and thus affords support for the bolster on which in turn is mounted the car body.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame member having pedestal openings, supporting wheel and axle assemblies journaled therein, springs on said side member adjacent each of said openings, a superposed frame member supported on said springs with guide means abutting said side member adjacent each opening and limiting longitudinal movement between said frame members, power means supported on said side frame member adjacent each pedestal opening, and brake rigging for each wheel comprising hanger levers fulcrumed at their lower ends from said side frame member and supporting intermediate their ends brake heads and brake shoes arranged for braking engagement with opposite peripheries of the adjacent wheel, and transversely arranged live and dead cylinder levers connected intermediate their ends, connected at opposite ends of the adjacent power means and connected at their inner ends to the upper ends of said hanger levers, one of the connections between said power means and said cylinder levers being automatically adjustable.

2. In a brake arrangement for a railway car truck, a frame member having a pedestal opening, a wheel and axle assembly journaled therein, inturned brackets on said frame member at opposite sides of said opening below the axle level, and braking means for said wheel comprising hanger levers fulcrumed at their lower ends from said brackets and supporting brake heads and brake shoes for engagement with opposite peripheries of said wheel, power means and slack adjuster means supported from said frame member over said opening, transversely arranged interconnected live and dead cylinder levers connected at their outer ends to said power means and slack adjuster means respectively and at their inner ends to said hanger levers, and a plurality of longitudinally arranged brackets on said frame member above said opening and at opposite sides thereof carrying guide and support means for said levers.

3. In a railway car truck, a side frame member having pedestal openings, supporting wheel and axle assemblies journaled therein, springs on said side member adjacent each of said openings, a superposed frame member supported on said springs with guide means abutting said side member adjacent each opening and limiting longitudinal movement between said frame members, power means supported on said side frame member adjacent each pedestal opening, and brake rigging for each wheel comprising hanger levers fulcrumed at their lower ends from said side frame member and supporting intermediate their ends brake heads and brake shoes arranged for braking engagement with opposite peripheries of the adjacent wheel, and transversely arranged live and dead cylinder levers connected intermediate their ends, connected at opposite ends of the adjacent power means and connected at their inner ends to the upper ends of said hanger levers.

4. In a brake arrangement for a railway car truck, a frame member having a pedestal jaw, a supporting wheel and axle assembly, inturned brackets on said frame member below the axle level, power means supported on said frame member above said pedestal jaw, and brake rigging comprising dead truck levers fulcrumed from said brackets respectively and transversely arranged live and dead cylinder levers connected at their inner ends to said brake levers, connected intermediate their ends to each other and connected at their outer ends to opposite ends of said power means, brackets on said frame at opposite sides and above said pedestal jaw, and means supported from said brackets for guiding said truck levers.

5. In a brake arrangement for a railway car truck, a side frame member having wheel connecting means, spaced supporting wheel and axle assemblies, a composite frame member having spaced transoms and an integral side member resiliently supported from said first-mentioned frame member, and braking means for each wheel at one side of the truck comprising power means supported from said first-mentioned frame member over the adjacent wheel connecting means, dead brake levers fulcrumed at their lower ends from said side frame member and supporting intermediate their ends brake heads and brake shoes arranged for engagement with opposite peripheries of the adjacent wheel, and interconnected live and dead cylinder levers connected at corresponding ends to said dead brake levers respectively and at their other ends to opposite ends of said power means, one of said last-mentioned connections being automatically adjustable.

6. In a brake arrangement for a railway car truck, a side frame member having wheel connecting means, spaced supporting wheel and axle assemblies, a composite frame member having spaced transoms and an integral side member resiliently supported from said first-mentioned frame member, and braking means for each wheel at one side of the truck comprising power means supported from said first-mentioned frame member over the adjacent wheel connecting means, dead brake levers fulcrumed at their lower ends from said side frame member and supporting intermediate their ends brake heads and brake shoes arranged for engagement with opposite peripheries of the adjacent wheel, and interconnected live and dead cylinder levers connected at corresponding ends to said brake levers respectively and at their other ends to opposite ends of said power means.

7. In a railway car truck, a lower frame member having wheel connecting means, power means supported thereon above said wheel connecting means, an upper frame member resiliently supported from said lower frame member, a wheel and axle assembly, and brake rigging comprising dead levers fulcrumed from said lower frame member below the axle level, live and dead cylinder levers connected intermediate their ends to each other, connected at corresponding ends to said dead brake levers above the axle level and connected at their other corresponding ends to opposite ends of said power means, said cylinder levers extending transversely of the truck over said upper frame member, and means on said lower frame member affording guiding support for said dead brake levers above the axle level and slidable support for the corresponding ends of said cylinder levers.

8. In a railway car truck, a lower frame member having wheel connecting means, power means supported thereon above said wheel connecting means, an upper frame member resiliently supported from said lower frame member, a wheel and axle assembly, and brake rigging comprising dead levers fulcrumed from said lower frame member below the axle level, live and dead cylinder levers connected intermediate their ends to each other, connected at corresponding ends to said dead brake levers above the axle level and connected at their other corresponding ends to opposite ends of said power means, one of said last-mentioned connections being automatically adjustable, and means on said lower frame member affording guiding support for said dead brake levers above the axle level and slidable support for the corresponding ends of said cylinder levers.

9. In a railway car truck, a side frame member having pedestal openings, supporting wheel and axle assemblies journaled therein, springs on said side member adjacent each of said openings, a superposed frame member supported on said springs with guide means abutting said side member adjacent each opening and limiting longitudinal movement between said frame members, power means supported on said side frame member adjacent each pedestal opening, and brake rigging for each wheel comprising hanger levers fulcrumed at their lower ends from said side frame member and supporting intermediate their ends brake heads and brake shoes arranged for braking engagement with opposite peripheries of the adjacent wheel, and guide brackets for said hanger levers supported from said side frame member above the axle level.

10. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, live and dead cylinder levers connected intermediate their ends to each other, connected at corresponding ends to said dead brake levers above the axle level and connected at their other corresponding ends to opposite ends of said power means, one of said last-mentioned connections being automatically adjustable, and means on said lower frame member affording guiding support for said dead brake levers above the axle level.

11. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, live and dead cylinder levers connected intermediate their ends to each other, connected at corresponding ends to said dead brake levers above the axle level and connected at their other corresponding ends to opposite ends of said power means, and means on said lower frame member affording guiding support for said dead brake levers above the axle level and slidable support for the corresponding ends of said cylinder levers.

12. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, live and dead cylinder levers connected intermediate their ends to each other, connected at corresponding ends to said dead brake levers above the axle level and connected at their other corresponding ends to opposite ends of said power means, said cylinder levers extending transversely of the truck over said upper frame member, and means on said lower frame member affording guiding support for said dead brake levers above the axle level.

13. In a brake arrangement for a railway car truck, a frame member having a pedestal jaw, a supporting wheel and axle assembly, inturned brackets on said frame member below the axle level, power means supported on said frame member above said pedestal jaw, and brake rigging comprising dead brake levers fulcrumed from said brackets respectively, and transversely arranged live and dead cylinder levers connected at their inner ends to said brake levers, connected intermediate their ends to each other and connected at their outer ends to opposite ends of said power means, brackets on said frame member at opposite sides of said pedestal jaw, and means supported from said brackets for guiding said truck levers and slidably supporting said cylinder levers.

14. In a brake arrangement for a railway car truck, a frame member having a pedestal opening, a wheel and axle assembly journaled therein, inturned brackets on said frame member at opposite sides of said opening below the axle level, and braking means for said wheel comprising hanger levers fulcrumed at their lower ends from said brackets and supporting brake heads and brake shoes for engagement with opposite peripheries of said wheel, power means and slack adjuster means supported from said frame member over said opening, and transversely arranged interconnected live and dead cylinder levers connected at their outer ends to said power means and slack adjuster means respectively and at their inner ends to said hanger levers.

15. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, and live and dead cylinder levers connected intermediate their ends to each other, connected at corresponding ends to said dead brake levers above the axle level and connected at their other corresponding ends to opposite ends of said power means, and means on said lower frame member affording guiding support for said dead brake levers above the axle level.

16. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, and live and dead cylinder levers connected intermediate their ends to each other, connected at corresponding ends to said dead brake levers above the axle level and connected at their other corresponding ends to opposite ends of said power means, said cylinder levers extending transversely of the truck over said upper frame member.

17. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, and live and dead cylinder levers connected intermediate their ends to each other, connected at corresponding ends to said dead brake levers above the axle level and connected at their other corresponding ends to opposite ends of said power means, one of said last-mentioned connections being automatically adjustable.

18. In a brake arrangement for a railway car truck, a frame member having a pedestal jaw, a supporting wheel and axle assembly, inturned brackets on said frame member below the axle level, power means supported on said frame member above said pedestal jaw, and brake rigging comprising dead brake levers fulcrumed from said brackets respectively, and transversely arranged live and dead cylinder levers connected at their inner ends to said brake levers, connected intermediate their ends to each other and connected at their outer ends to opposite ends of said power means.

19. In a brake arrangement for a railway car truck, a frame member having a pedestal jaw, a supporting wheel and axle assembly, inturned brackets on said frame member below the axle level, power means supported on said frame member above said pedestal jaw, and brake rigging comprising dead truck levers fulcrumed from said brackets respectively, and transversely arranged live and dead cylinder levers connected at their inner ends to said truck levers and connected at their outer ends to opposite ends of said power means, one of said last-mentioned connections being adjustable.

20. In a railway car truck, a lower frame member having wheel connecting means, power means supported thereon above said wheel connecting means, an upper frame member resiliently supported from said lower frame member, a wheel and axle assembly, and brake rigging comprising dead brake levers fulcrumed from said lower frame member below the axle level, and live and dead cylinder levers connected intermediate their ends to each other, connected at corresponding ends to said dead brake levers above the axle level and connected at their other corresponding ends to opposite ends of said power means.

21. In a railway car truck, a lower frame member having wheel connecting means, power means supported on said member, an upper frame member resiliently supported from said lower member, a wheel and axle assembly, and brake rigging comprising dead brake levers fulcrumed from said lower frame member, and live and dead cylinder levers connected intermediate their ends to each other, connected at corresponding ends to said dead brake levers, and connected at their other corresponding ends to opposite ends of said power means.

22. In a railway car truck, a lower frame member having wheel connecting means, power means supported on said member, an upper frame member resiliently supported from said lower member, a wheel and axle assembly, and brake rigging comprising dead brake levers supported at opposite sides of said assembly, and live and dead cylinder levers connected at corresponding ends thereof to said brake levers and at the opposite corresponding ends thereof to said power means.

23. In a railway car truck, an equalizer member, a frame member resiliently supported thereon, a supporting wheel and axle assembly, and brake rigging comprising dead brake levers fulcrumed from said equalizer member at opposite sides of said assembly, and actuating means therefor comprising live and dead cylinder levers connected at corresponding ends to said brake levers and connected intermediate their ends to each other, and power means associated with the other corresponding ends of said cylinder levers.

24. In a railway car truck, an equalizer member, a frame member resiliently supported thereon, power means mounted on said equalizer member, a supporting wheel and axle assembly, and brake rigging comprising dead truck levers fulcrumed at their lower ends from one of said members at opposite sides of said assembly, and an operative connection between said levers and said means.

25. In a railway car truck, an equalizer member, a frame member resiliently supported thereon, a supporting wheel and axle assembly, and brake rigging comprising dead truck levers fulcrumed at the lower ends thereof from said equalizer member, and actuating means associated with said levers.

26. In a railway car truck, a side frame comprising wheel connecting means, spaced supporting wheel and axle assemblies, brake rigging comprising dead truck levers positioned at opposite sides of each assembly and fulcrumed at the lower ends thereof from said frame, and power means operatively associated with said levers, said power means comprising a power cylinder, interconnected live and dead cylinder levers connected to opposite ends thereof, and an operative connection between each cylinder lever and the adjacent truck lever.

27. In a railway car truck, spaced supporting wheel and axle assemblies, journal boxes associated therewith, a lower frame member supported from the boxes at each side of said truck, an upper frame member resiliently supported on the lower member, and brake rigging comprising truck levers fulcrumed at the lower ends thereof from the lower member, and actuating means associated with said levers.

28. In a brake arrangement, a frame member, a supporting wheel and axle assembly and brake rigging for said assembly consisting of dead truck levers at opposite sides of said assembly and each fulcrumed below the axle level from said frame member, and power means associated with said levers, said power means comprising interconnected live and dead cylinder levers operatively connected to respective of said truck levers.

29. In a brake arrangement, a frame member, a supporting wheel and axle assembly and brake rigging for said assembly consisting of dead truck levers at opposite sides of the axis of said assembly and each fulcrumed at its lower end from said frame member, and power means associated with said levers, said power means comprising a power cylinder, interconnected live and dead truck levers operatively associated therewith, and an operative connection between each of said cylinder levers and the adjacent of said truck levers.

30. In a brake arrangement, a vehicle frame, a supporting wheel and axle assembly, and brake rigging comprising dead truck levers fulcrumed from said frame at opposite sides of said assembly, cylinder levers connected to respective truck levers, and power means intermediate said cylinder levers and operatively associated therewith.

31. In an equalizer for a railway car truck comprising spaced supporting wheel and axle assemblies, a member having intermediate the ends thereof portions adapted to seat upon the journal boxes associated with said assemblies, and brake lever support brackets on said member beneath the axle level of said assemblies, certain of said brackets being disposed at the ends of said member, and other of said brackets being disposed intermediate said ends.

32. In an equalizer for a railway car truck, a member having adjacent the ends thereof portions adapted to seat upon associated journal boxes, spring seats on said member intermediate the ends thereof, and brake lever support brackets on said member beneath the level of said seats, certain of said brackets being disposed at respective ends of said member, and other of said brackets being disposed intermediate said ends.

33. In an equalizer for a railway car truck comprising spaced supporting wheel and axle assemblies, a member having intermediate the ends thereof portions adapted to seat upon the journal boxes associated with said assemblies, and brake lever support brackets on said member beneath the axle level of said assemblies, certain of said brackets being disposed at the ends of said member, and other of said brackets being disposed intermediate said ends, said member having at each end thereof guide means for associated lever structure, said guide means being disposed above said axle level.

34. In an equalizer for a railway car truck comprising spaced wheel and axle assemblies, a member having intermediate the ends thereof portions adapted to seat upon the journal boxes of respective assemblies, and brake hanger brackets at the ends of said member disposed beneath the axle level of said assemblies.

35. In an equalizer for a railway car truck, a member having adjacent each end thereof a portion adapted to seat upon an associated journal box, seats on said member intermediate the ends thereof for associated frame supporting springs, and a brake hanger bracket on each extremity of said member and disposed beneath the level of said seats.

36. An equalizer for a railway car truck having adjacent each end thereof a portion adapted to embrace the journal box of an associated wheel and axle assembly, and an inturned brake hanger bracket on each extremity of said equalizer beneath the axle level of said assembly.

37. In combination, an equalizer for a railway car truck, spaced supporting wheel and axle assemblies, and a brake hanger bracket on each end of said equalizer outwardly of the adjacent assembly and beneath the axle level.

CARL E. TACK.